July 25, 1972   S. AUSNIT   3,679,511
FLEXIBLE PILFER PROOF CLOSURE CONSTRUCTION FOR BAGS
Filed Feb. 18, 1970
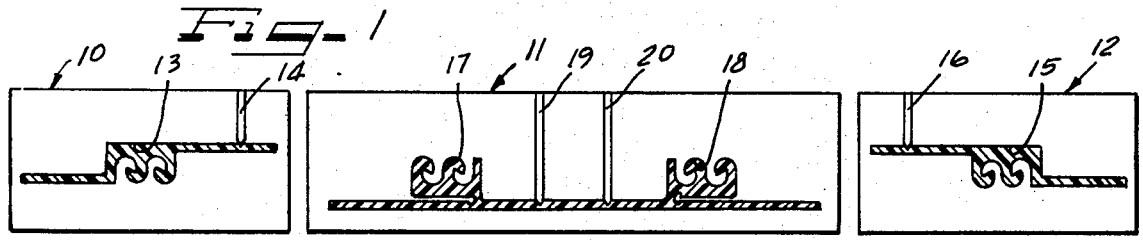
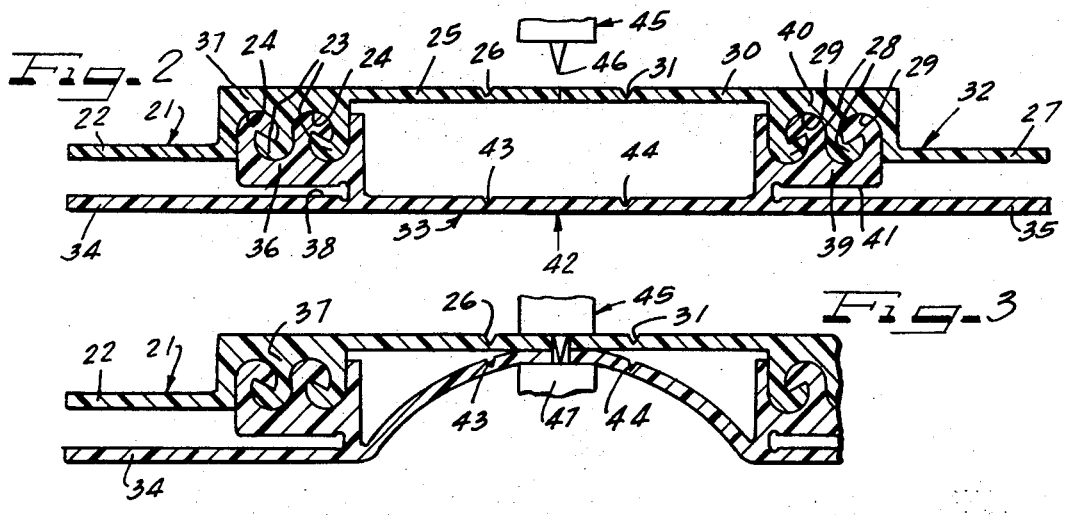
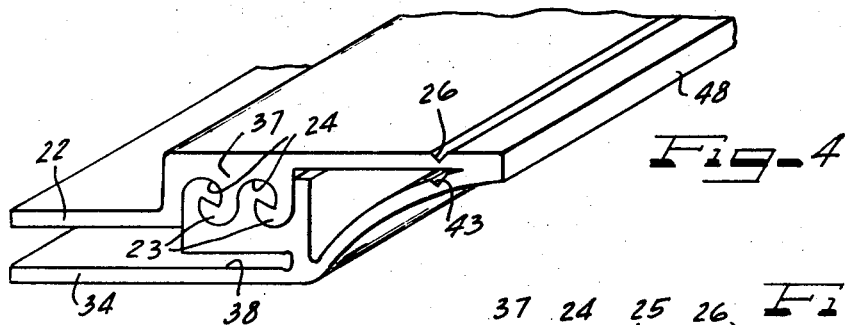
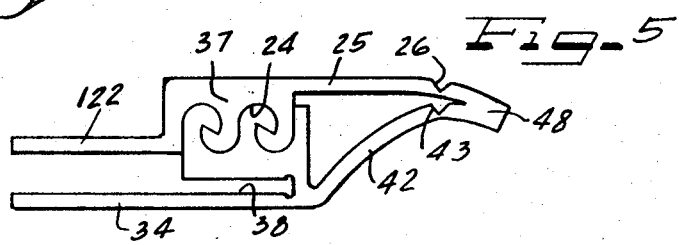
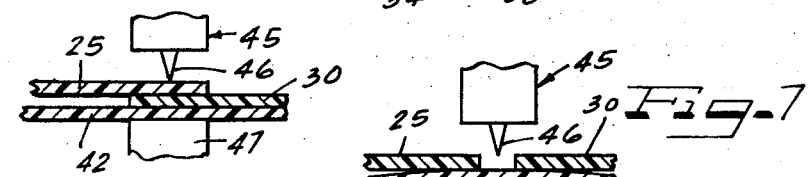
INVENTOR.
STEVEN AUSNIT
BY ATTORNEYS

United States Patent Office 3,679,511
Patented July 25, 1972

3,679,511
FLEXIBLE PILFER PROOF CLOSURE CONSTRUCTION FOR BAGS
Steven Ausnit, 124 E. 61st St., New York, N.Y. 10021
Filed Feb. 18, 1970, Ser. No. 12,185
Int. Cl. B32b 31/26
U.S. Cl. 156—251
8 Claims

ABSTRACT OF THE DISCLOSURE

Closure device for bags, pouches, and other articles, consisting of two outer and one inner interengaging webs of resilient, flexible material, said webs having ribs and grooves therein shaped complementarily to interlock with each other, the two outer webs having end portions which are brought together and merged with the inner web into a heat sealed bead, with each web having lines of weakness formed therein in close proximity to the bead whereby said web can be torn open to provide access to its interlocking elements and said bead can also be readily severed to form separate closure tubes.

CROSS REFERENCE TO RELATED APPLICATION

This application has subject matter in common with a copending application of mine, Ser. No. 12,187, filed on Feb. 18, 1970.

BACKGROUND OF THE INVENTION

Field of the invention

This invention is in the field of reclosable closure elements composed of flexible, resilient material in which the engagement occurs by virtue of complementarily shaped ribs and grooves in the webs making up the closure, with the webs including either two outer, aligned end portions or one joined unitary outer portion which are heat sealed together with a lower central portion and with each web provided with lines of weakness adjacent to the heat sealed end or central portions, and severing the end portions along these lines of weakness so as to provide access to the closure elements.

DESCRIPTION OF THE PRIOR ART

The prior art of closure elements in which the closures are provided by interengaging strips of plastic material is quite extensive. One of the best examples from this prior art of such closure elements will be found in the Madsen Pat. No. 2,613,421 owned by the assignee of the present application.

The present invention is directed to a method for the manufacture of a plurality of closure elements which are substantially pilferproof in that the closure element is not directly accessible from the exterior of the bag but requires separating or tearing a plastic strip to make it accessible. The provision of this tear line makes it possible for a merchandiser of articles embodying bags with these closure elements to determine whether said container has been tampered with. Closure elements of this general type have been described in U.S. Pat. No. 3,172,443 and in U.S. Pat. No. 3,226,787, both owned by the assignee of the present application.

The method of the present invention involves the simultaneous formation of a plurality of closure elements from which individual closures can be derived. To that extent, it is similar to the subject matter disclosed and claimed in U.S. Pat. No. 3,219,084 which is also owned by the assignee of the present invention.

SUMMARY OF THE INVENTION

The method of the present invention involves providing a plurality of strips of heat sealable material, the strips having a central web portion with spaced lines of weakness on opposite sides of the center of the central web portions, and interengageable rib and groove means between the lines of weakness and the marginal edges of the strips, and having outer web portions with interengageable rib and groove means which are assembled to engage the rib and groove means of the central web portion after which the thus engaged strips are heat sealed together in a confined area intermediate the spaced lines of weakness, and finally severed to produce individual continuous strips. The strips can also be produced so that the outer web portions are extruded as one integral unit.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic view of extrusion die assemblies which can be used to form the webs making up the closure element of the present invention;

FIG. 2 is a view of the strips in assembled relation prior to the heat sealing operation;

FIG. 3 is a view similar to FIG. 2 illustrating the condition of the elements during a joint heat sealing and severing operation;

FIG. 4 is a view in perspective of the finished closure element;

FIG. 5 is an enlarged view in cross-section showing the manner in which the heat sealed bead can be severed from the closure element;

FIG. 6 is a fragmentary cross-sectional view of the modified form of the invention in which two of the component outer webs of the strips are overlapped prior to heat sealing; and FIG. 7 is a fragmentary cross-sectional view of a further modified form of the invention in which the two component outer webs of the strips are positioned in closely spaced relation prior to heat sealing.

DESCRIPTION OF THE PREFERRED EMBODIMENTS

In FIG. 1, reference numerals 10, 11 and 12 indicate generally three extrusion dies which can be employed for manufacturing the components of the closure strip of the present invention. Die 10 has a cavity 13 which is used to provide ribs and grooves in the closure element of one of the outer webs, and a knife edge 14 is included in the die to provide a groove which forms a line of weakness in the strip.

Die 12 is essentially similar to die 10 as it includes a cavity for extruding integral ribs and grooves into the other outer web member and also includes a knife edge 16 for providing a line of weakness in the strip comparable to that provided by the knife edge 14 in die 10.

Die 11 includes a pair of enlarged extruding cavities 17 and 18 which provide the rib and groove elements of the inner web which interlock with the formed rib and groove elements of the outer webs to provide the releasable locking engagement between the webs. A pair of knife edges 19 and 20 are included in die 11 to provide lines of weakness in the inner web portion of the extruded strip intermediate the two rib and groove engaging portions, and about opposite those of the outer web when the webs are engaged, as will subsequently be explained.

The structure of the strips produced by the dies shown in FIG. 1 is best illustrated in FIG. 2 where the strips are shown in their engaged position prior to heat sealing. The outer web strip 21 produced in the die 10 has a flat marginal end portion 22 and a substantially thicker portion 37 containing ribs 23 and grooves 24 and an upper portion 25 in which there is a line of weakness 26 provided by the presence of the knife edge 14 in the die structure. The outer web strip 32 produced in the die 12 has a flat marginal end portion 27, and a substantially thicker portion 40 containing ribs 28 and grooves 29 and a flat portion 30 in which there is a line of weakness 31 provided by the presence of the knife edge 16 in the die. In the particular embodiment shown in FIG. 2, the web strips 21 and 32 are dimensioned such that they are in abutting relation for the heat sealing operation. As illustrated in FIGS. 6 and 7, however, the two strips may be made to overlap in the heat sealing area, as shown in FIG. 6, or they may be positioned such that they are spaced from each other in closely spaced relation as shown in FIG. 7, provided that the end portions of the two strips are sufficiently closely spaced as to be within the temperature zone provided by the heat sealing element.

Returning to FIG. 2, the inner web strip 33 produced in the die 11 has a pair of flat marginal end portions 34 and 35 which are substantially coextensive with the marginal end portions 22 and 27 of the strips 21 and 32, respectively. Rib and groove portions 36 and 39 are arranged to be releasably received within the ribs and grooves 23 and 24 of strip 21 and the ribs and grooves 28 and 29 of strip 32. A slot 38 is formed beneath the rib and groove portion 36 to add flexibility to the structure, providing a hinge-type effect permitting the rib and groove portion 36 to flex somewhat under load. Similarly, a groove 41 is disposed beneath the rib and groove portion 39.

A web portion 42 extends between the two rib and groove portions 36 and 39 and has a pair of lines of weakness 43 and 44 at opposite sides of the center of the web. These lines of weakness 43 and 44 are generally in vertical alignment with the lines of weakness 26 and 31 provided in the overlying strips 21 and 32.

With the strips in the assembled relation shown in FIG. 2, the assembly is subjected to a heat sealing operation and, optionally, a severing operation. For this purpose, there is provided a heat sealing element generally indicated at reference numeral 45 which carries a knife edge 46 for causing severing of the webs at the same time the heat sealing is being accomplished. Alternatively, the severing can be accomplished after the heat sealing, as by providing slots or perforations in the heat sealed area which define lines of weakness for subsequent tearing.

An anvil 47 is positioned below the web portion 42, and the two web portions 30 and 42 are brought into intimate contact as shown in FIG. 3 of the drawings. The heat sealing element 45 which may be energized by high frequency electromagnetic energy or the like tends to rapidly heat seal the central portions of the webs between the lines of weakness 26 and 31 and between the lines of weakness 43 and 44. The result, as shown in FIG. 4, is the production of an integral bead 48 which forms the top closure for one of the finished pilfer proof closure elements. An identical closure element is simultaneously formed opposite the said element and is either severed from the same during the heat sealing operation or later.

The marginal edge portions 22 and 34 of the closure member illustrated in FIG. 4 are arranged to be secured to a bag, pouch, or other receptacle by any suitable means such as heat sealing. Then, when the bag is to be opened, it is a simple matter to tear off the bead 48 by applying a flexing pressure on the bead 48 as shown in FIG. 5, causing the webs 25 and 42 to be split along the lines of weakness 26 and 43. The closure elements represented by the flexible rib and groove portions 37 and 36 are then accessible for opening by applying a force which disengages the respective ribs and grooves. The closure can then be resealed by pressing the respective ribs into their complementary grooves.

It is generally desirable to carry out all the discussed heat sealing operations simultaneously, that is to say the marginal edge portions 22 and 34 are heat sealed to one set of bag walls at the same time as the marginal edge portions 27 and 35 are heat sealed to another set of bag walls and at the same time as the central web portions 30 and 42 are heat sealed to each other. Thereafter the two joined closure tubes created by the above heat sealing operation are cross sealed and then severed along the line of weakness created during extrusion or the heat sealing process to yield two sets of pilfer proof containers.

While the foregoing description deals specifically with a pair of strips constituting the outer web, it shall be recognized that a single extruded strip having integral rib and groove portions at each end can also be employed.

In summary the invention provides a method of making a closure structure to simultaneously form two closures for the tops of separate bags which comprises extruding a first strip means comprising a pair of strips of heat sealable plastic material each having first fastener profiles extending therealong on the lower surface thereof, extruding a second strip means having spaced apart parallel second fastener profiles on the upper surface thereof shaped and spaced to interlock with the profiles of the first strip means. Each of the strip means has a central web portion between the profiles and marginal portions outwardly of the profiles, and each of the strip means has spaced apart tear lines outwardly of the center of the web portions. In the method the first strip means is positioned on the second strip means, and the profiles are interlocked with the central web portions of the pair of upper strips in adjacency, such as by arranging them in abutting relationship such as shown in FIG. 3 or overlapping as shown in FIG. 6 or with a slight space therebetween as shown in FIG. 7. A center area of the web is heat sealed to join the first and second strip means with a seam of a width sufficiently narrow not to extend to said tear lines, and thereafter the center of the seam is cut leaving the first and second strip means attached by the seam at each side of the cut.

I claim as my invention:

1. The method of making a closure structure to simultaneously form two closures for the tops of separate bags which comprises extruding a first strip means comprising a pair of strips of heat sealable plastic material each having spaced apart first fastener profiles extending therealong on the lower surface thereof, extruding a second strip means having spaced apart parallel second fastener profiles on the upper surface thereof shaped and spaced to interlock with the profiles of the first strip means, each of said strip means having central web portions between the profiles and marginal portions outwardly of the profiles, each of said strip means having spaced apart tear lines outwardly of the center of said web portions, positioning the first strip means on the second strip means and interlocking the profiles with the central web portions of the pair of strips in adjacency, heat sealing a center area of said web portions of said first and second strip means to each other to form a seam of a width sufficiently narrow not to extend to said tear lines, and cutting the center of the seam leaving said first and second strip means attached by the seam at each side of said cut.

2. The method of making a closure structure to simultaneously form two closures for the tops of separate bags in accordance with the steps of claim 1 wherein said central web portions are positioned with their inner edges abutting.

3. The method of making a closure structure to simultaneously form two closures for the tops of separate bags in accordance with the steps of claim 1 wherein said central web portions are positioned in overlapping relationship.

4. The method of making a closure structure to simultaneously form two closures for the tops of separate bags in accordance with claim 1 wherein said central web portions are arranged to have a small space between them.

5. The method of making a closure structure to simultaneously form two closures for the tops of separate bags in accordance with claim 1 wherein said tear lines are in the form of weakened indentations in the plastic material.

6. The method of making a closure structure to simultaneously form two closures for the tops of separate bags in accordance with claim 1 wherein said step of heat sealing and said step of cutting are performed simultaneously.

7. The method of making a closure structure to simultaneously form two closures for the tops of separate bags in accordance with the steps of claim 1 wherein said heat sealing is formed by an element energized by a high frequency electromagnetic energy.

8. The method of making a closure structure to simultaneously form two closures for the tops of separate bags which comprises extruding a first strip means of heat sealable plastic material having spaced apart parallel first fastener profiles extending therealong on the lower surface thereof, extruding a second strip means having spaced apart parallel second fastener profiles on the upper surface thereof shaped and spaced to interlock with the profiles of the first strip means, each of said strip means having central web portions between the profiles and marginal portions outwardly of the profiles, each of said strip means having spaced apart tear lines outwardly of the center of said web portions, positioning the first strip means on the second strip means and interlocking the profiles, heat sealing a center area of said web portions to each other to form a seam of a width sufficiently narrow not to extend to the tear lines, and cutting the center of the seam leaving said first and second strip means attached by the seam at each side of said cut.

References Cited
UNITED STATES PATENTS

| | | | |
|---|---|---|---|
| 3,226,787 | 1/1966 | Ausnit | 150—3 X |
| 3,473,589 | 10/1969 | Götz | 150—3 |
| 3,219,084 | 11/1965 | Ausnit et al. | 150—3 |

BENJAMIN A. BORCHELT, Primary Examiner

D. BENT, Assistant Examiner

U.S. Cl. X.R.

150—3